US012515137B2

(12) United States Patent
Gonen et al.

(10) Patent No.: US 12,515,137 B2
(45) Date of Patent: Jan. 6, 2026

(54) IN-ENVIRONMENT REPORTING OF ABUSE IN A VIRTUAL ENVIRONMENT

(71) Applicant: Roblox Corporation, San Mateo, CA (US)

(72) Inventors: Aykud Gonen, San Mateo, CA (US); David M. Lyu, San Mateo, CA (US); Chi Ming Wong, San Mateo, CA (US); James Carlson, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 462 days.

(21) Appl. No.: 18/298,955

(22) Filed: Apr. 11, 2023

(65) Prior Publication Data

US 2024/0342614 A1 Oct. 17, 2024

(51) Int. Cl.

| | |
|---|---|
| ***A63F 13/75*** | (2014.01) |
| ***A63F 13/497*** | (2014.01) |
| ***A63F 13/52*** | (2014.01) |
| ***A63F 13/525*** | (2014.01) |
| ***A63F 13/533*** | (2014.01) |

(Continued)

(52) U.S. Cl.

CPC ............ *A63F 13/75* (2014.09); *A63F 13/497* (2014.09); *A63F 13/52* (2014.09); *A63F 13/525* (2014.09); *A63F 13/533* (2014.09); *A63F 13/79* (2014.09); *A63F 13/85* (2014.09); *A63F 13/86* (2014.09); *A63F 2300/5586* (2013.01); *A63F 2300/8082* (2013.01)

(58) Field of Classification Search

CPC ........ A63F 13/52; A63F 13/525; A63F 13/79; A63F 13/85; A63F 13/497; A63F 13/533; A63F 13/86; A63F 13/75; A63F 2300/5586; A63F 2300/5553

See application file for complete search history.

(56) References Cited

U.S. PATENT DOCUMENTS 6,050,896 A * 4/2000 Hanado ................ A63F 13/837 463/32
6,468,157 B1 * 10/2002 Hinami .................. A63F 13/10 463/31

(Continued)

OTHER PUBLICATIONS

USPTO, Non-final Office Action for U.S. Appl. No. 18/231,098, Jul. 2, 2025, 8 pages.

(Continued)

*Primary Examiner* — William H McCulloch, Jr.
*Assistant Examiner* — William H McCulloch
(74) *Attorney, Agent, or Firm* — IP Spring

(57) ABSTRACT

A metaverse application receives, from a user, a request to report abuse that occurs in a virtual experience. Responsive to receiving the request, the metaverse application captures a three-dimensional (3D) capture of the virtual experience. The metaverse application generates a two-dimensional (2D) capture from the 3D capture. The metaverse application determines a list of avatars in the 2D capture. The metaverse application mixes the additional audio with the encoded audio. The metaverse application generates a list of candidates from the list of avatars based on whether the avatars are visible to the user. The metaverse application generates graphical data for displaying an overlay on the 2D capture with the list of candidates that is user-selectable to provide a report of abuse.

20 Claims, 7 Drawing Sheets

(51) Int. Cl.

| | |
|---|---|
| ***A63F 13/79*** | (2014.01) |
| ***A63F 13/85*** | (2014.01) |
| ***A63F 13/86*** | (2014.01) |

(56) References Cited

U.S. PATENT DOCUMENTS

| | | | | |
|---|---|---|---|---|
| 7,621,812 | B2 * | 11/2009 | Kawamoto | A63F 13/45 463/31 |
| 7,628,698 | B2 * | 12/2009 | Ajioka | A63F 13/525 463/36 |
| 8,840,469 | B2 * | 9/2014 | Kawamoto | A63F 13/10 463/32 |
| 9,387,400 | B2 | 7/2016 | Norden | |
| 10,796,477 | B2 * | 10/2020 | Skidmore | G06T 15/20 |
| 10,984,587 | B2 * | 4/2021 | Duka | A63F 13/85 |
| 11,151,791 | B2 * | 10/2021 | Skidmore | G06T 19/006 |
| 11,169,824 | B2 * | 11/2021 | Rubenfield | G06T 15/005 |
| 11,410,330 | B2 * | 8/2022 | Skidmore | G06T 7/80 |
| 11,625,894 | B2 * | 4/2023 | Duka | G06T 17/20 463/31 |
| 2006/0126927 | A1 * | 6/2006 | Vesely | G06F 3/011 382/154 |
| 2006/0128471 | A1 | 6/2006 | Willis et al. | |
| 2009/0132500 | A1 | 5/2009 | Jones et al. | |
| 2013/0177313 | A1 | 7/2013 | Hirth et al. | |
| 2014/0024452 | A1 * | 1/2014 | Fujisawa | A63F 13/25 463/31 |
| 2015/0062125 | A1 * | 3/2015 | Aguilera Perez | G06T 7/75 345/427 |
| 2018/0350103 | A1 * | 12/2018 | Skidmore | G06T 7/73 |
| 2018/0365884 | A1 * | 12/2018 | Skidmore | G06T 19/006 |
| 2018/0367484 | A1 | 12/2018 | Rodriguez et al. | |
| 2019/0272184 | A1 * | 9/2019 | Rubenfield | G06T 19/006 |
| 2019/0318543 | A1 * | 10/2019 | Skidmore | G06T 15/20 |
| 2020/0020155 | A1 * | 1/2020 | Duka | G06T 7/596 |
| 2020/0179813 | A1 | 6/2020 | Perry | |
| 2023/0118119 | A1 | 4/2023 | Chachek et al. | |
| 2023/0219007 | A1 * | 7/2023 | Rudi | A63F 13/86 463/42 |
| 2024/0139625 | A1 * | 5/2024 | Eder | G06T 11/60 |
| 2024/0342614 | A1 * | 10/2024 | Gonen | A63F 13/75 |
| 2025/0050207 | A1 * | 2/2025 | O'Sullivan | A63F 13/79 |
| 2025/0069157 | A1 * | 2/2025 | Khurana | H04L 63/306 |
| 2025/0069596 | A1 * | 2/2025 | Nandwana | G10L 15/26 |

OTHER PUBLICATIONS

USPTO, International Search Report for International Patent Application No. PCT/US2024/023915, Jul. 31, 2024, 2 pages.

USPTO, Written Opinion for International Patent Application No. PCT/US2024/023915, Jul. 31, 2024, 7 pages.

* cited by examiner

IN-ENVIRONMENT REPORTING OF ABUSE IN A VIRTUAL ENVIRONMENT

BACKGROUND

Abuse in a virtual environment occurs in multiple ways. For example, avatars may wear offensive outfits, avatars may perform offensive actions, players may say offensive things, and players may type offensive words into a group chat. When handling an abuse report within a virtual environment, a moderator relies on concrete evidence to take action on the abuse. Some abuse types, such as offensive chat messages are easy to moderate because the group chats are logged. Conversely, avatar actions and dynamic content in the virtual environment in the virtual environment are not recorded, and users cannot easily provide evidence when reporting abuse.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a system and method to generate a list of candidates that is user-selectable to provide a report of abuse. According to one aspect, a method includes receiving, from a user, a request to report abuse that occurs in a virtual experience. The method further includes responsive to receiving the request, capturing a three-dimensional (3D) capture of the virtual experience. The method further includes generating a two-dimensional (2D) capture from the 3D capture. The method further includes determining a list of avatars in the 2D capture. The method further includes generating a list of candidates from the list of avatars based on whether the avatars are visible to the user. The method further includes generating graphical data for displaying an overlay on the 2D capture with the list of candidates that is user-selectable to provide a report of abuse.

In some embodiments, generating the 2D capture from the 3D capture includes determining a near-clip plane and a far-clip plane of a virtual camera that includes a field of view of the user between the near-clip plane and the far-clip plane. In some embodiments, generating the list of candidates from the list of avatars based on whether the avatars are visible to the user includes, for each avatar in the list of avatars: generating a bounding box that surrounds the avatar, casting a ray from the bounding box to the near-clip plane, and determining that the avatar is visible to the user responsive to the ray intersecting with the near-clip plane. In some embodiments, generating the list of candidates further includes, for each candidate in the list of candidates: responsive to determining that the ray does not intersect with the near-clip plane, casting a set of rays from one or more edges of the bounding box to the near-clip plane and determining that the candidate is visible responsive to one or more rays from the set of rays intersecting with the near-clip plane. In some embodiments, generating the list of candidates further includes, for each candidate in the list of candidates: responsive to determining that the ray does not intersect with the near-clip plane, casting a second ray from the near-clip plane to the bounding box and determining that the avatar is visible responsive to the second ray intersecting with the avatar. In some embodiments, the report of abuse includes an identification of a type of abuse that is selected from the group of an inappropriate avatar, an inappropriate voice input, an inappropriate action, an inappropriate object in the 2D capture, and combinations thereof. In some embodiments, the method further includes receiving, from the user, a selection of one or more of the candidates in the list of candidates for the report of abuse and including the 2D capture of the virtual experience, an identification of a type of abuse, and an identifier of a selected avatar in the report of abuse. In some embodiments, the method further includes providing the report of abuse to a machine-learning model, wherein the machine-learning model outputs a determination of whether at least one candidate from the selection of the one or more candidates committed abuse. In some embodiments, the method further includes blocking the selected one or more candidates and responsive to the report of abuse including an identification of an inappropriate object in the 2D capture, hiding the inappropriate object from the virtual experience.

According to one aspect, non-transitory computer-readable medium with instructions that, when executed by one or more processors at a client device, cause the one or more processors to perform operations, the operations, the operations comprising: receiving, from a user, a request to report abuse that occurs in a virtual experience; responsive to receiving the request, capturing a three-dimensional (3D) capture of the virtual experience; generating a 2D capture from the 3D capture; determining a list of avatars in the 2D capture; generating a list of candidates from the list of avatars based on whether the avatars are visible to the user; and generating graphical data for displaying an overlay on the 2D capture with the list of candidates that is user-selectable to provide a report of abuse.

In some embodiments, generating the 2D capture from the 3D capture includes determining a near-clip plane and a far-clip plane of a virtual camera that includes a field of view of the user between the near-clip plane and the far-clip plane. In some embodiments, wherein generating the list of candidates from the list of avatars based on whether the avatars are visible to the user includes, for each avatar in the list of avatars: casting a ray from the avatar to the near-clip plane and determining that the avatar is visible to the user responsive to the ray intersecting with the near-clip plane. In some embodiments, generating the list of candidates from the list of avatars based on whether the avatars are visible to the user includes, for each avatar in the list of avatars: generating a bounding box that surrounds the avatar, casting a ray from the bounding box to the near-clip plane, and determining that the avatar is visible to the user responsive to the ray intersecting with the near-clip plane. In some embodiments, generating the list of candidates further includes, for each candidate in the list of candidates: responsive to determining that the ray does not intersect with the near-clip plane, casting a set of rays from one or more edges of the bounding box to the near-clip plane and determining that the candidate is visible responsive to one or more rays from the set of rays intersecting with the near-clip plane.

According to one aspect, a system includes a processor and a memory coupled to the processor, with instructions stored thereon that, when executed by the processor, cause the processor to perform operations comprising: receiving, from a user, a request to report abuse that occurs in a virtual experience; responsive to receiving the request, capturing a three-dimensional (3D) capture of the virtual experience; generating a 2D capture from the 3D capture; determining a list of avatars in the 2D capture; generating a list of candidates from the list of avatars based on whether the avatars are visible to the user; and generating graphical data for displaying an overlay on the 2D capture with the list of candidates that is user-selectable to provide a report of abuse.

In some embodiments, generating the 2D capture from the 3D capture includes determining a near-clip plane and a far-clip plane of a virtual camera that includes a field of view of the user between the near-clip plane and the far-clip plane. In some embodiments, wherein generating the list of candidates from the list of avatars based on whether the avatars are visible to the user includes, for each avatar in the list of avatars: casting a ray from the avatar to the near-clip plane and determining that the avatar is visible to the user responsive to the ray intersecting with the near-clip plane. In some embodiments, generating the list of candidates from the list of avatars based on whether the avatars are visible to the user includes, for each avatar in the list of avatars: generating a bounding box that surrounds the avatar, casting a ray from the bounding box to the near-clip plane, and determining that the avatar is visible to the user responsive to the ray intersecting with the near-clip plane. In some embodiments, generating the list of candidates further includes, for each candidate in the list of candidates: responsive to determining that the ray does not intersect with the near-clip plane, casting a set of rays from one or more edges of the bounding box to the near-clip plane and determining that the candidate is visible responsive to one or more rays from the set of rays intersecting with the near-clip plane.

The application advantageously describes a way to automatically identify avatars that are visible to a user and capture information about abuse that was previously difficult to report.

DETAILED DESCRIPTION

Example Network Environment 100

Figure 1:
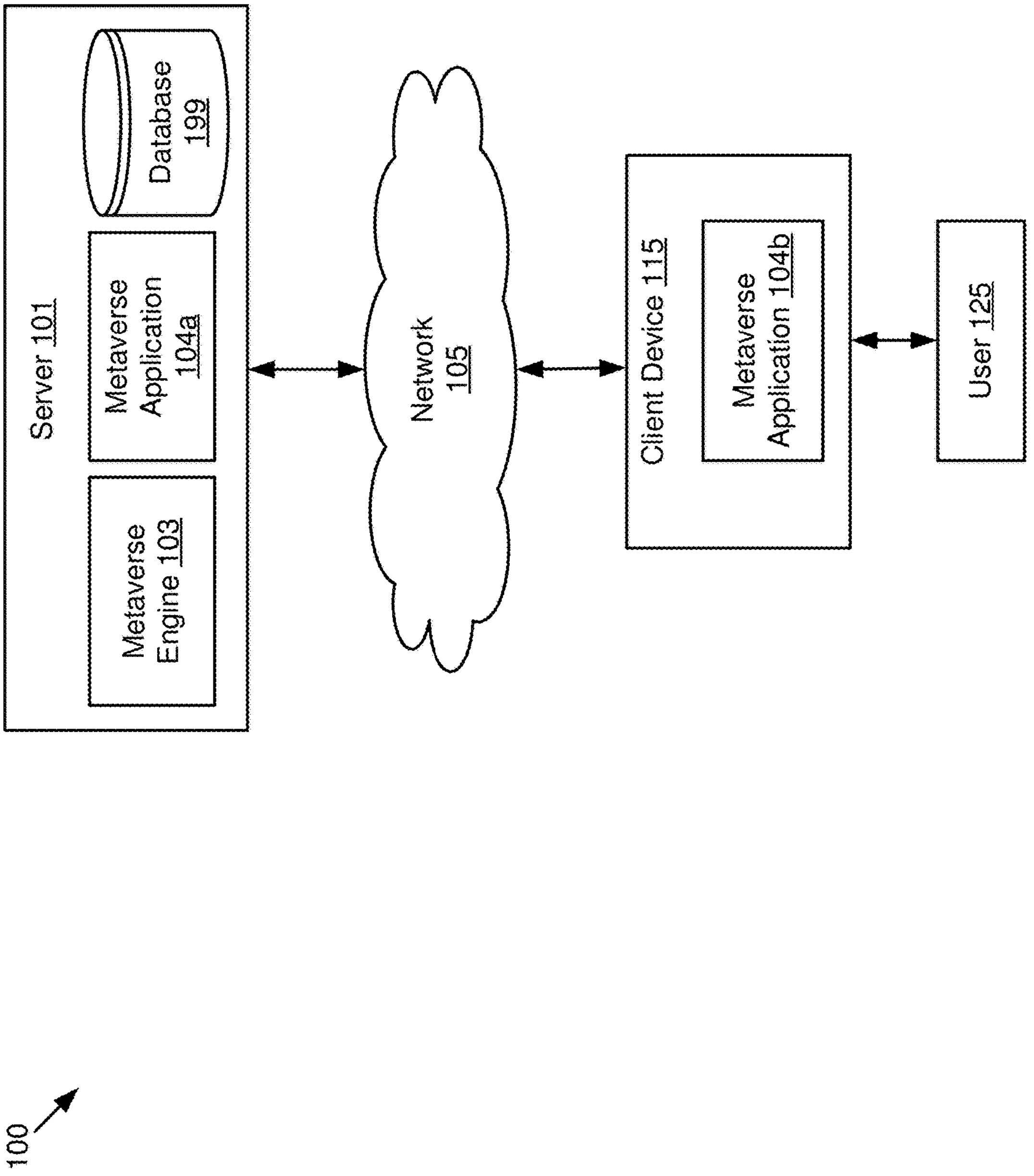
FIG. 1 is a block diagram of an example network environment, according to some embodiments described herein.

FIG. 1 illustrates a block diagram of an example environment 100. In some embodiments, the environment 100 includes a server 101 and client device 115, coupled via a network 105. User 125 may be associated with the client device 115. In some embodiments, the environment 100 may include other servers or devices not shown in FIG. 1. For example, the server 101 may include multiple servers 101 and the client device 115 may include multiple client devices 115*a, n*. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the client devices 115. The server 101 may include a metaverse engine 103, a metaverse application 104*a*, and a database 199.

In some embodiments, the metaverse engine 103 includes code and routines operable to generate and provide a metaverse, such as a three-dimensional (3D) virtual environment. The virtual environment may include one or more virtual experiences in which one or more users can participate as an avatar. An avatar may wear any type of outfit, perform various actions, and participate in gameplay or other type of interaction with other avatars. Further, a user associated with an avatar may communicate with other users in the virtual experience via text chat, voice chat, video (or simulated video) chat, etc.

Virtual experiences may be hosted by a platform that provides the virtual environment. Virtual experiences in the metaverse/virtual environment may be user-generated, e.g., by creator users that design and implement virtual spaces within which avatars can move and interact. Virtual experiences may have any type of objects, including analogs of real-world objects (e.g., trees, cars, roads) as well as virtual-only objects.

The virtual environment may support different types of users with different demographic characteristics (age, gender, location, etc.). For example, users may be grouped into groups such as users below 13, users between 14-16 years old, users between 16-18 years old, adult users, etc. The virtual environment platform may benefit from providing a suitable and safe experience to different users. For this purpose, the virtual environment platform may implement automated, semi-automated, and/or manual techniques to provide platform safety. Such techniques may include detection of abuse, including abusive/offensive behavior (e.g., gestures or actions performed by an avatar); abusive communication (e.g., via text, voice, or video chat); inappropriate objects (e.g., avatars wearing clothing with inappropriate words or symbols; objects of inappropriate shapes and/or motion); etc.

In some embodiments, the metaverse application 104*a* includes code and routines operable to receive, from a user, a request to report abuse that occurs in a virtual experience. The metaverse application 104*a* captures a 3D capture of the virtual experience. The metaverse application 104*a* generates a two-dimensional (2D) capture from the 3D capture. For example, the metaverse application 104*a* may generate a near-clip plane of a virtual camera that represents a perspective of a user avatar associated with the user. The metaverse application 104*a* generates a list of candidates from the 2D capture based on whether the avatars are visible to the user avatar in the virtual experience. The metaverse application 104*a* generates graphical data for displaying an overlay on the 2D capture with the list of candidates that is user-selectable to provide a report of abuse.

In some embodiments, the metaverse engine 103 and/or the metaverse application 104*a* are implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the virtual experience hosted by the metaverse engine 103, such as a current game state, user profiles, etc.

The client device 115 may be a computing device that includes a memory and a hardware processor. For example, the client device 115 may include a mobile device, a tablet computer, a mobile telephone, a wearable device, a head-mounted display, a mobile email device, a portable game player, a portable music player, a game console, an augmented reality device, a virtual reality device, a reader device, or another electronic device capable of accessing a network 105.

The client device 115 includes metaverse application 104*b*. In some embodiments, the client device 115 performs one or more of the steps described above with reference to metaverse application 104*a*. In some embodiments, the metaverse application 104*b* receives the graphical data for displaying the overlay and displays the overlay.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the client devices 115, in practice one or more networks 105 may be coupled to these entities.

Example Computing Device 200

Figure 2:
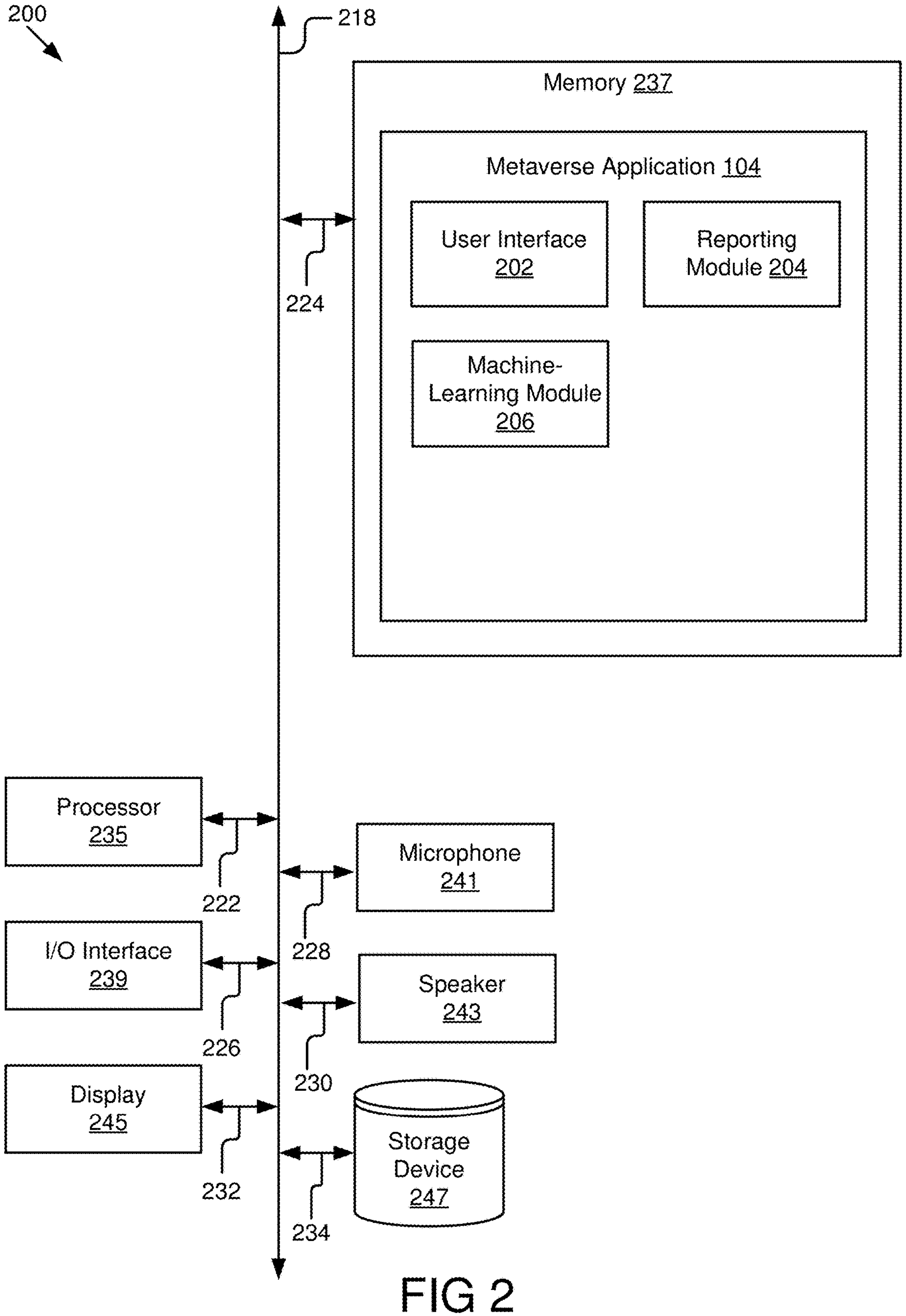
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, the computing device 200 is the client device 115. In some embodiments, the computing device 200 is the server 101.

In some embodiments, computing device 200 includes a processor 235, a memory 237, an Input/Output (I/O) interface 239, a microphone 241, a speaker 243, a display 245, and a storage device 247, all coupled via a bus 218. In some embodiments, the computing device 200 includes additional components not illustrated in FIG. 2. In some embodiments, the computing device 200 includes fewer components than are illustrated in FIG. 2. For example, in instances where the metaverse application 104 is stored on the server 101 in FIG. 1, the computing device may not include a microphone 241, a speaker 243, or a display 245.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. In some implementations, the processor 235 may include special-purpose units, e.g., machine learning processor, audio/video encoding and decoding processor, etc. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200, such as a keyboard, mouse, etc.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse application 104, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server 101 and deliver the data to the metaverse application 104 and components of the metaverse application 104, such as the user interface module 202. In some embodiments, the I/O interface 239 can connect to interface devices such as input devices (keyboard, pointing device, touchscreen, microphone 241, sensors, etc.) and/or output devices (display 245, speaker 243, etc.).

Some examples of interfaced devices that can connect to I/O interface 239 can include a display 245 that can be used to display content, e.g., images, video, and/or a user interface of the metaverse as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, a projector (e.g., a 3D projector), or other visual display device.

The microphone 241 includes hardware, e.g., one or more microphones that detect audio spoken by a person. The microphone 241 may transmit the audio to the metaverse application 104 via the I/O interface 239.

The speaker 243 includes hardware for generating audio for playback. In some implementations, the speaker 243 may include audio hardware that supports playback via an external, separate speaker (e.g., wired or wireless headphones, external speakers, or other audio playback device) that is coupled to device 200.

The storage device 247 stores data related to the metaverse application 104. For example, the storage device 247 may store a user profile associated with a user 125, a list of blocked avatars, etc.

Example Metaverse Application 104

FIG. 2 illustrates a computing device 200 that executes an example metaverse application 104 that includes a user interface module 202, a reporting module 204, and a machine-learning module 206. In some embodiments, a single computing device 200 includes all the components illustrated in FIG. 2. In some embodiments, one or more of the components may be on different computing devices 200. For example, the user device 115 may include the user interface 202 and the reporting module 204, while the machine-learning module 206 is implemented on the server 101. In some embodiments, different portions of one or more of modules 202-206 may be implemented on the user device 115 and on the server 101.

The user interface module 202 generates graphical data for displaying a user interface for users associated with client devices to participate in a 3D virtual experience. In some embodiments, before a user participates in the virtual experience, the user interface module 202 generates a user interface that includes information about how the user's information may be collected, stored, and/or analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

The user interface module 202 receives user input from a user during interaction with a virtual experience. For example, the user input may instruct a user avatar to move around in the virtual experience. The user interface module 202 generates graphical data for displaying the location of the user avatar within the virtual experience.

The user avatar may interact with other avatars in the virtual experience. Some of these interactions may be negative and, in some embodiments, the user interface module 202 generates graphical data for a user interface that enables a user to request to report abuse that occurs in the virtual experience. For example, another avatar may be wearing an objectionable piece of clothing, an avatar may be holding an inappropriate object (e.g., a flag associated with a hate group, an object in the shape of something offensive, etc.), an avatar may perform an offensive action (e.g., the avatar may use spray paint to draw an image of genitals), or a user may utter an inappropriate phrase (e.g., either in a chat box or directly via voice chat to the user). One avatar may be associated with multiple types of abuse, such as wearing inappropriate clothing while performing an offensive act.

The user interface may receive a request from the user to report abuse that occurs in the virtual experience. For example, the user interface may include a report button, which indicates that the user wants to report abuse, such as an inappropriate avatar, an inappropriate voice input, an inappropriate action, an inappropriate object, or a combination of different types of abuse.

The reporting module 204 receives the request to report abuse. In order to enable the user to report abuse associated with an avatar, the reporting module 204 generates a list of candidates, e.g., avatars that are proximate to a user avatar in the virtual experience. However, because the virtual experience is a 3D experience, there may be avatars in the virtual experience that are not visible to the user avatar (e.g., occluded by a wall or other object, occluded by another avatar, invisible avatars, avatars that are too far away from the user avatar, etc.) and therefore, the avatars that are not visible to the user avatar are to be excluded from the list of candidates.

The reporting module 204 captures a 3D capture of the virtual experience. The 3D capture of the virtual experience is a freeze frame of the game state captured at the time that the user requests to report abuse. The game state includes the objects, scripts, players, etc. in the virtual experience at the instance of the capture of the capture. In some embodiments, the reporting module 204 compresses, transfers, and stores the 3D capture of the virtual experience and submits the 3D capture as part of the report. During moderation review, the 3D capture may be replayed in a virtual environment for inspection.

In some embodiments, the reporting module 204 captures a 3D video of the virtual experience as well. This may be advantageous for capturing abuse in the form of movement involving an offensive gesture, a facial emotion, etc.

In some embodiments, the reporting module 204 determines a 2D capture from the 3D capture. For example, the reporting module 204 determines a near-clip plane and a far-clip plane of a virtual camera that includes a field of view of the user between the near-clip plane and the far-clip plane.

Figure 3:
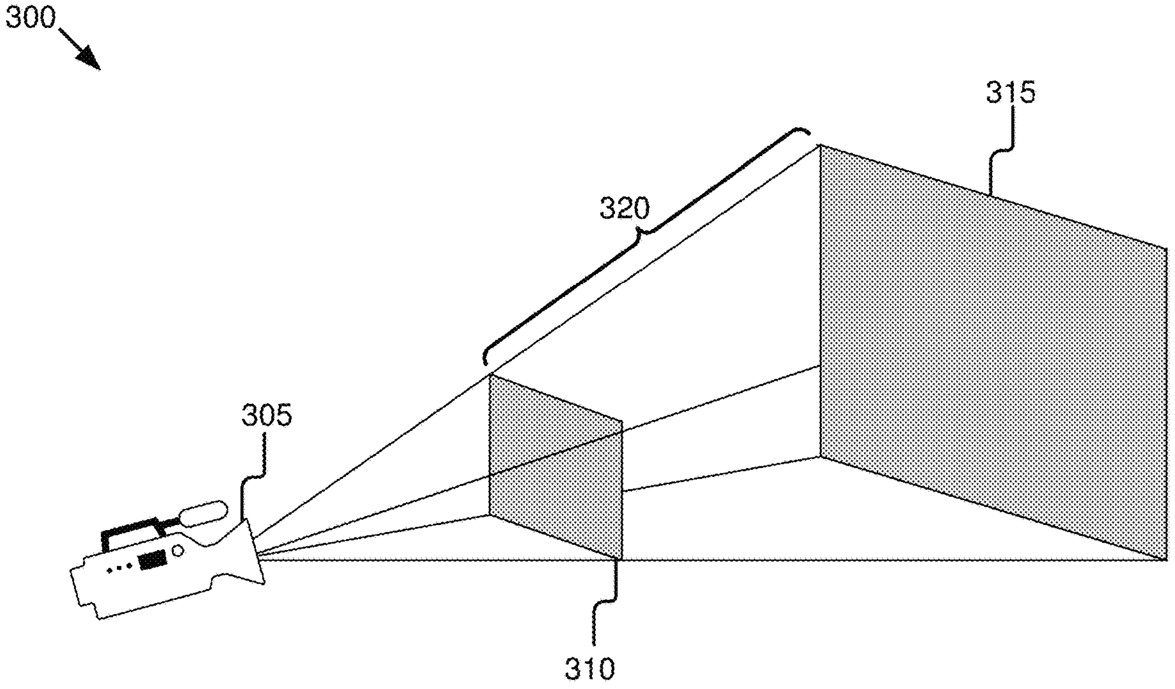
FIG. 3 is an example of a field of view of a virtual camera, according to some embodiments described herein.

FIG. 3 is an example 300 of a field of view of a virtual camera 305. The field of view of the virtual camera 305 corresponds to the view of the user. For example, the field of view of the virtual camera 305 may be positioned to correspond to the location of the user's eyes.

A common type of projection is called a perspective projection, which makes objects near the virtual camera 305 appear larger than objects in the distance. The virtual experience in a perspective projection is a clipped pyramid with a top and bottom that are defined as a near-clip plane 310 and a far-clip plane 315, respectively. The space in between the near-clip plane 310 and the far-clip plane 315 is called a viewing frustum 320. A viewing frustum 320 is defined by a field of view and by the distances of the near-clip plane 310 and the far-clip plane 315, which are specified in z-coordinates (x-y coordinates refer to the plane of the user avatar). Objects may be visible to the user when they are within the viewing frustum 320, while objects outside the viewing frustum 320 are not visible to the user, as these objects are not within the user gaze.

The reporting module 204 determines a list of avatars in the 2D capture. For example, the reporting module 204 may determine the list of avatars by calling a function (provided by the virtual experience platform) that identifies avatars present in a particular area of a virtual experience. The reporting module 204 may also determine a location of each of the avatars in the list of avatars in the virtual experience. In some embodiments, the list of avatars in the 3D capture are within the field of view of the user. The reporting module 204 may determine whether the avatars in the list of avatars are within the field of view by determining a bounding box for each player's avatar in the virtual experience and perform a course check of whether the bounding boxes are within the user's field of view by computing a worst-case subtended angle and distance range for the bounding box at its distance from the user avatar and determining whether the distance range overlaps the viewing frustrum in angle and distance.

In some embodiments, the reporting module 204 determines a list of objects (e.g., assets) in the 2D capture. For example, the reporting module 204 may determine the list of objects based on asking the game state for a list of all instances of an ObjectValue, where an ObjectValue stores a single reference to another object.

Figure 4:
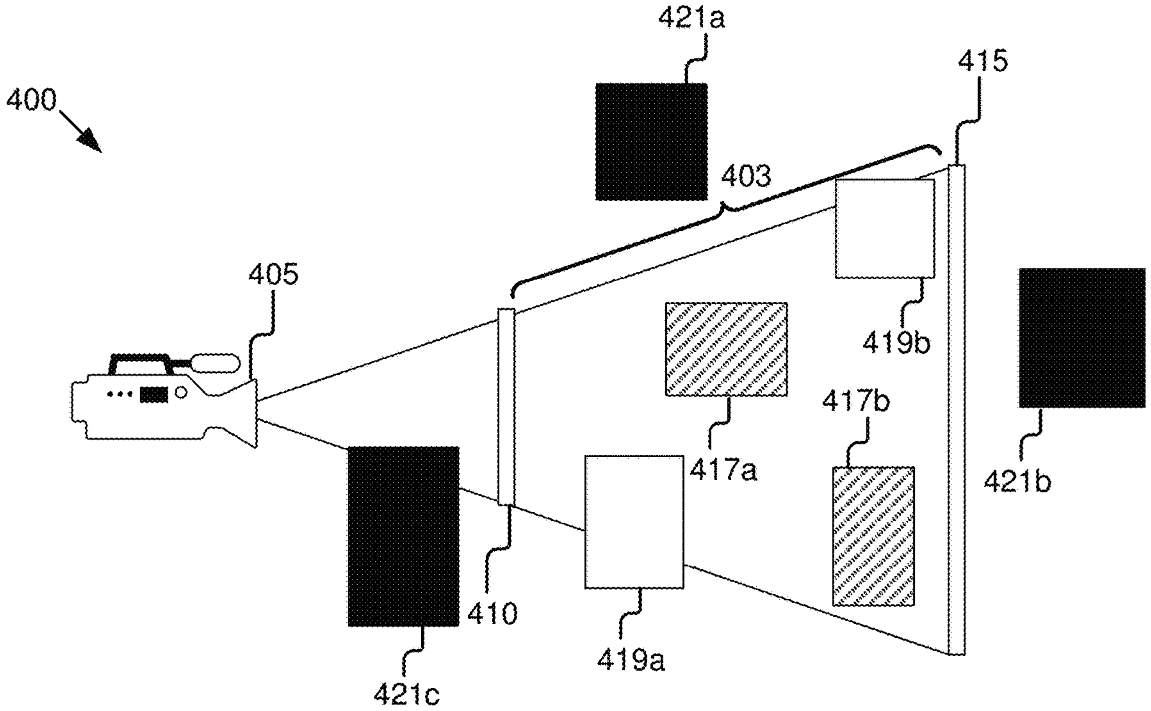
FIG. 4 includes an example of avatars inside and outside the viewing frustum, according to some embodiments described herein.

FIG. 4 illustrates an example 400 of avatars inside and outside the viewing frustum 403 that is between a near-clip plane 410 and a far-clip plane 415. As mentioned above, the reporting module 204 determines bounding boxes 417*a*, 417*b*, 419*a*, 419*b*, 421*a*, 421*b*, and 421*c*, each corresponding to a respective avatar in the virtual experience that is proximate to the user avatar in the virtual experience and in the gaze direction of the user avatar. The bounding boxes are divided into three categories: bounding boxes 417*a*, 417*b* correspond to avatars that are fully within the viewing frustum 403, bounding boxes 419*a*, 419*b* correspond to avatars that are partially within the viewing frustum 403 and are considered potentially viewable by the user avatar, and bounding boxes 421*a*, 421*b*, 421*c* correspond to avatars that are outside the viewing frustum 403. For example, bounding box 421*c* is in front of the near-clip plane 410, bounding box 421*a* is outside the viewing frustum 403, and bounding box 421*b* is behind the far-clip plane 415 and, as a result, avatars corresponding to each of the three bounding boxes 421*a*-421*c* are not visible.

The reporting module 204 generates a list of candidates from the list of avatars based on whether the avatars are visible to a user in the virtual experience that is associated with the user. For example, avatars corresponding to bounding boxes 417*a* and 417*b* are included in the list of candidates. In some embodiments, the reporting module 204 determines whether the avatars are visible to the user by, for each candidate in the list of avatars, casting a ray from the avatar to the near-clip plane and determining that the avatar is visible responsive to determining that the ray intersects with the near-clip plane. In some embodiments, the reporting module 204 casts the ray from the center of the avatar to the near-clip plane. In some embodiments, the reporting module 204 determines whether objects are visible to the user by casting rays from objects and determining whether the rays from the objects intersect with the near-clip plane.

Figure 5:
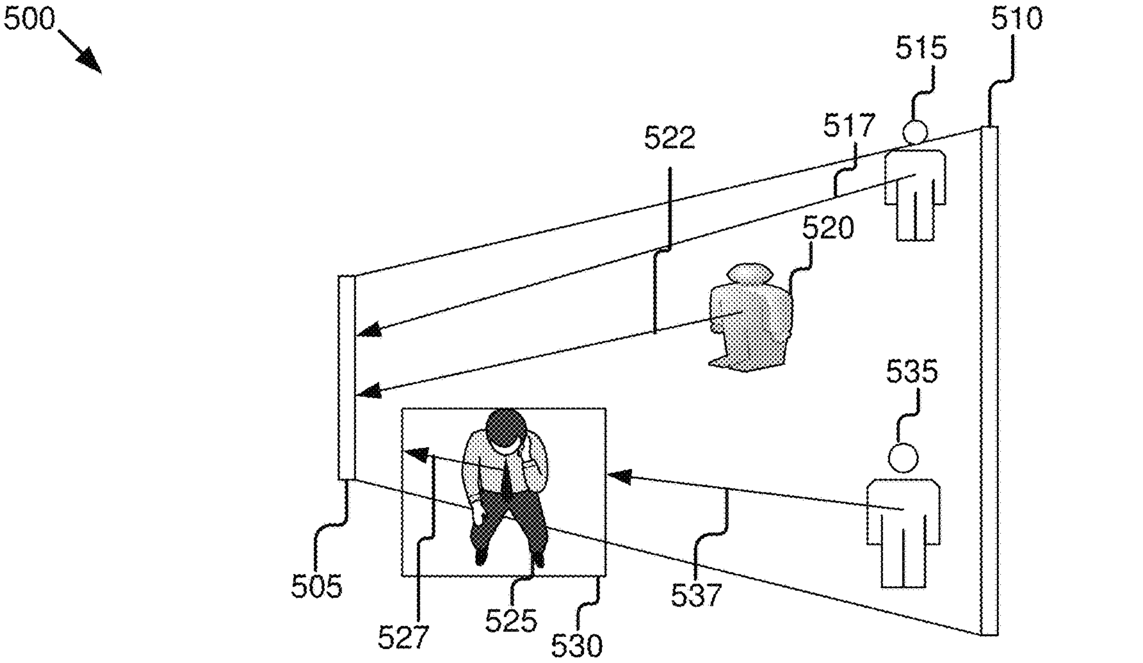
FIG. 5 includes an example of determining a list of candidates from a list of avatars, according to some embodiments described herein.

FIG. 5 illustrates an example 500 of determining a list of candidates from a list of avatars. The list of candidates is based on the list of avatars that the reporting module 204 determined were located between the near-clip plane 505 and the far-clip plane 510. The reporting module 204 casts rays from the avatars 515, 520, 525, 535 to the near-clip plane 505.

The reporting module 204 includes avatar 515 in the list of candidates because the ray 517 from the avatar 515 reaches the near-clip plane 505. The reporting module 204 also includes avatar 520 in the list of candidates because the ray 522 from avatar 520 reaches the near-clip plane 505. The reporting module 204 does not include avatar 525 in the list of candidates because the avatar 525 is inside a building 530 that prevents the ray 527 from reaching the near-clip plane 505. The reporting module 204 does not include avatar 535 in the list of candidates because the building 530 prevents the ray 537 from reaching the near-clip plane 505.

The 2D capture represents a freeze frame of a game state, but the underlying game state continues while the reporting module 204 performs the ray casting. Because the avatars in the game state may still be moving, it is valuable to have the ray casting occur quickly so that determinations are made while the avatars are in similar positions as when the user report is initiated. Otherwise, if an avatar moves too much between initiating the report and performing the ray casting, it may be difficult to associate the avatar with the proper identity in the game state. Rewinding the game state may not be feasible because the metaverse application 104 is designed to work on older and/or low-end computing devices. As a result, in some embodiments, instead of ray casting from the avatars to the near-clip plane, the reporting module 204, for each avatar in the list of avatars, generates a bounding box, casts a ray from bounding box to the near-clip plane, and determines that the avatar is visible to the user responsive to the ray intersecting with the near-clip plane. The bounding box encapsulates all the limbs of the avatar for identification, which is advantageously used to determine portions of the avatar that are visible even in cases of occlusion.

Figure 6:
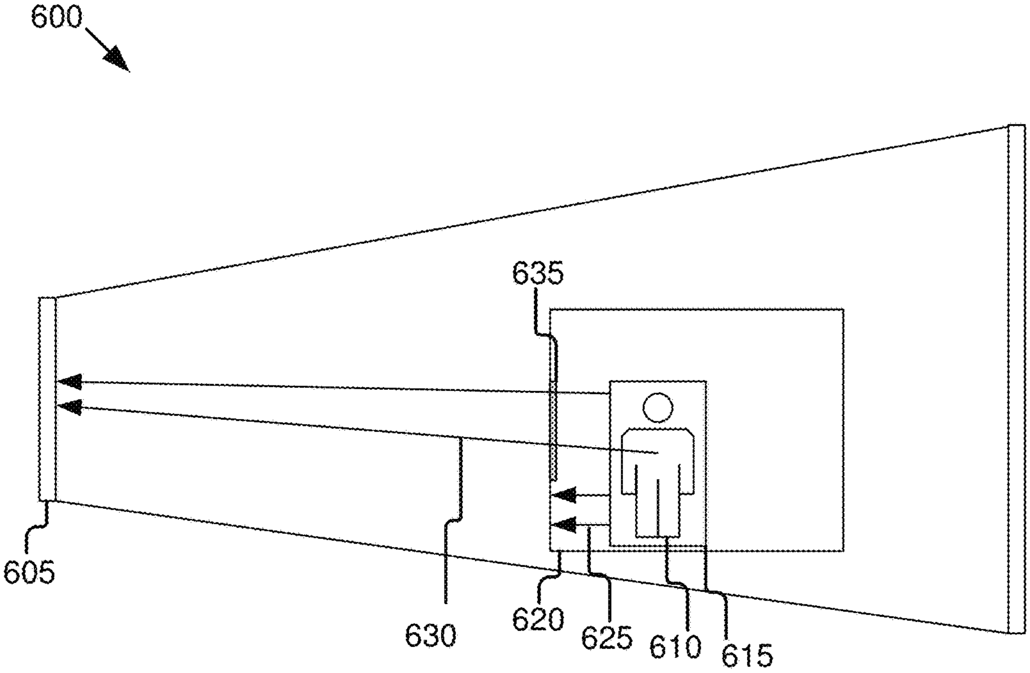
FIG. 6 includes an example of determining a list of candidates from a list of avatars using bounding boxes and a set of rays, according to some embodiments described herein.

FIG. 6 illustrates an example 600 of determining a list of candidates from a list of avatars using bounding boxes and a set of rays. The avatar 610 is within a bounding box 615. A set of rays are cast from the bounding box 615 to the near-clip plane 605. In some embodiments, at least one of the rays 630 is cast from the midline of the avatar 610.

Although the avatar 610 is inside a building 620, the avatar 610 may still be able to create abuse that is viewable by a user because the building 620 has a window 635. For example, the avatar 610 may be able to perform an offensive gesture with the avatar's 610 hands that is visible through the window 635. Casting a set of rays results in some rays being blocked by the building 620, such as ray 625. But other rays, such as ray 630, move through the window 635 and intersect with the near-clip plane 605.

In some embodiments, certain barriers may exist between the near-clip plane and an avatar that the ray cast may permeate, even though the barrier prevents the avatar from being visible. For example, fog may prevent a user from seeing a particular avatar. The reporting module 204 may determine a density of the barrier and determine whether to include the avatar in a list of candidates based on a density of the barrier. For example, thin fog may still allow the avatar to be visible, but thicker fog may be impenetrable.

In some embodiments, the virtual experience may include a physical barrier between an avatar and the near-clip plane that blocks the rays even though the avatar is visible. For example, if the avatar is standing behind a tree or a bush, the avatar may be at least partially visible even though the tree or bush may prevent the rays from reaching the near-clip plane. In some embodiments, if a ray that is cast from the avatar or bounding box does not intersect with the near-clip plane, the reporting module 204 may cast a second ray from the near-clip plane to the avatar and determine that the avatar is visible if the second ray intersects with the avatar.

Once the reporting module 204 generates the list of candidates, the user interface module 202 generates graphical data for displaying an overlay on the 2D capture with the list of candidates that is user-selectable to provide a report of abuse. In some embodiments, the list of candidates includes objects.

Figure 7:
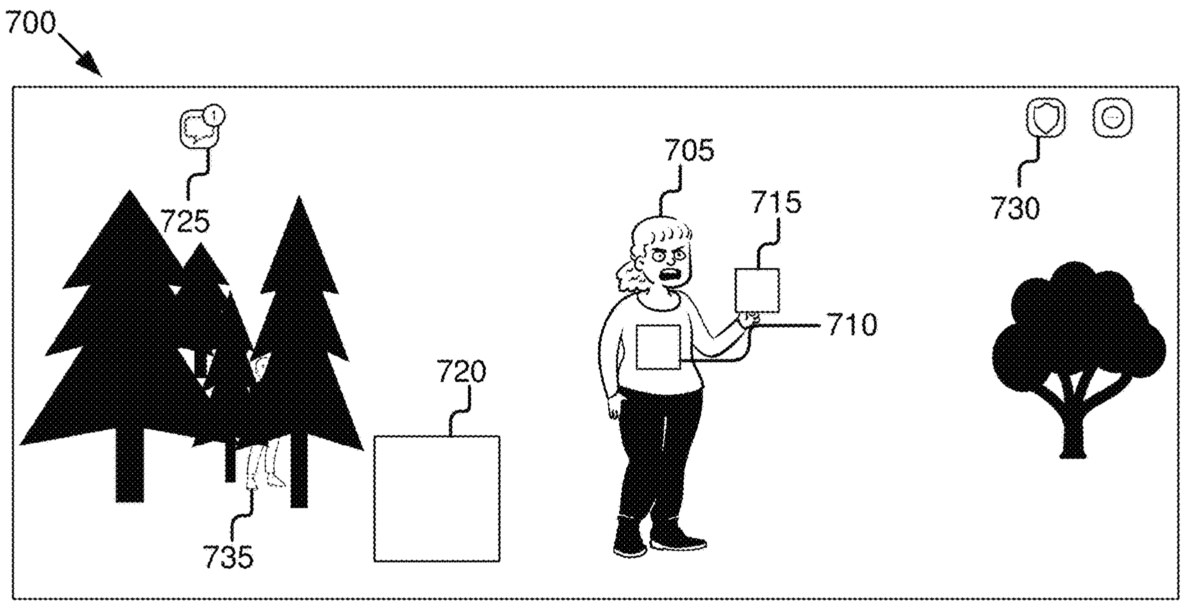
FIG. 7 includes an example user interface with a report button for reporting abuse in a virtual experience, according to some embodiments described herein.

FIG. 7 illustrates an example user interface 700 with a report button for reporting abuse in a virtual experience. The virtual experience may include many types of abuse. For example, an avatar 705 may be associated with offensive voice input, the avatar 705 may be wearing offensive clothing 710, the avatar 705 may be performing an offensive action, such as an offensive gesture 715, the virtual experience may include offensive objects 720, or a player may provide abuse via a chat box 725 and/or via voice chat (not shown).

A user may request to report abuse by selecting a report icon 730. The reporting module 204 may generate a 2D capture and determine a list of avatars in the 2D capture. In this example, the list of avatars includes avatar 705 and avatar 735. The reporting module 204 generates a list of candidates from the list of avatars based on whether the avatars are visible to the user in the virtual experience. In this example, the list of candidates includes avatar 705 and not avatar 735 because avatar 735 is obscured by thick trees. In some embodiments, e.g., if the trees have smaller leaves or if avatar 735 is in the empty space between trees, avatar 735 may be included in the list of candidates.

Figure 8:
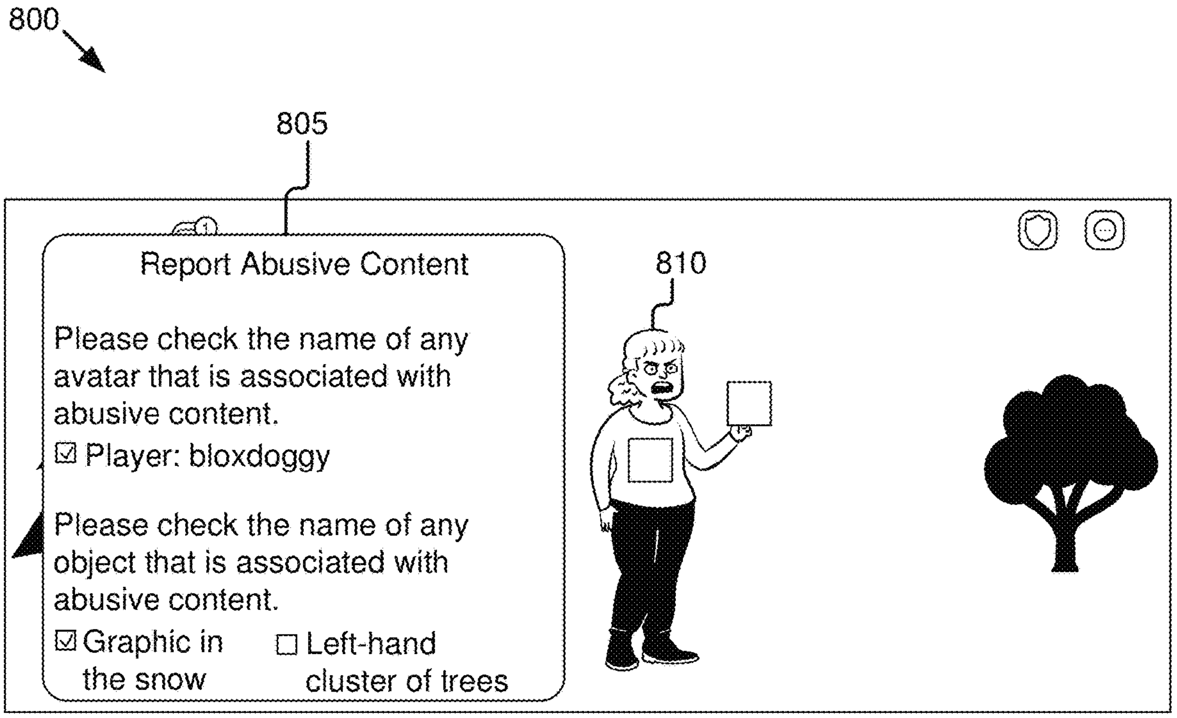
FIG. 8 includes an example user interface with an overlay that includes a list of candidates and objects that are user-selectable to provide a report of abuse, according to some embodiments described herein.

FIG. 8 illustrates an example user interface 800 with an overlay 805 that includes a list of candidates and objects that are user-selectable to provide a report of abuse. The user interface 202 may generate an overlay 805 with clickable boxes (or other user interface elements) for avatars and objects that the user can then report for being associated with abuse. In some embodiments, a static image may be provided to the user and the user may indicate abuse by clicking on elements (e.g., avatar hand, avatar face, etc.) within the static image to indicate the abuse.

In some embodiments, once the user identifies that an avatar is associated with abuse, the user interface may include an option for listing the types of abuse associated with the avatar. For example, the types of abuse may be displayed in a dropdown, from which the user can choose. In this example, the user has identified that the avatar (705) and a particular object (720) are associated with abuse.

Once the user selects one or more candidates in the list of candidates and/or one or more objects in the list of objects for the report of abuse, the reporting module 204 submits the report of abuse. As part of the report of abuse, the reporting module 204 may submit the capture of the virtual experience (e.g., the 2D capture and/or the 3D capture), an identification of a type of abuse, and an identifier of a selected avatar (e.g., the player's name). In some embodiments, the report may also include a video (e.g., a video of the virtual experience captured from the perspective of the reporting user, starting at the instant the report function was initiated). In some embodiments, the report may include accessory and clothing information for the reported avatar as well.

As described in greater detail below, the report of abuse may be provided to a machine-learning model that outputs a determination of whether one or more of the selected candidates committed abuse. Alternatively, or in addition, the report of abuse may also be reviewed by a human moderator.

As a result of submitting the report of abuse, the reporting module 204 may block and/or mute the selected candidate. If the report of abuse includes an identification of an inappropriate object in the capture, the reporting module 204 may hide the inappropriate object from the virtual experience for the user or remove the inappropriate object from the virtual experience.

Figure 9:
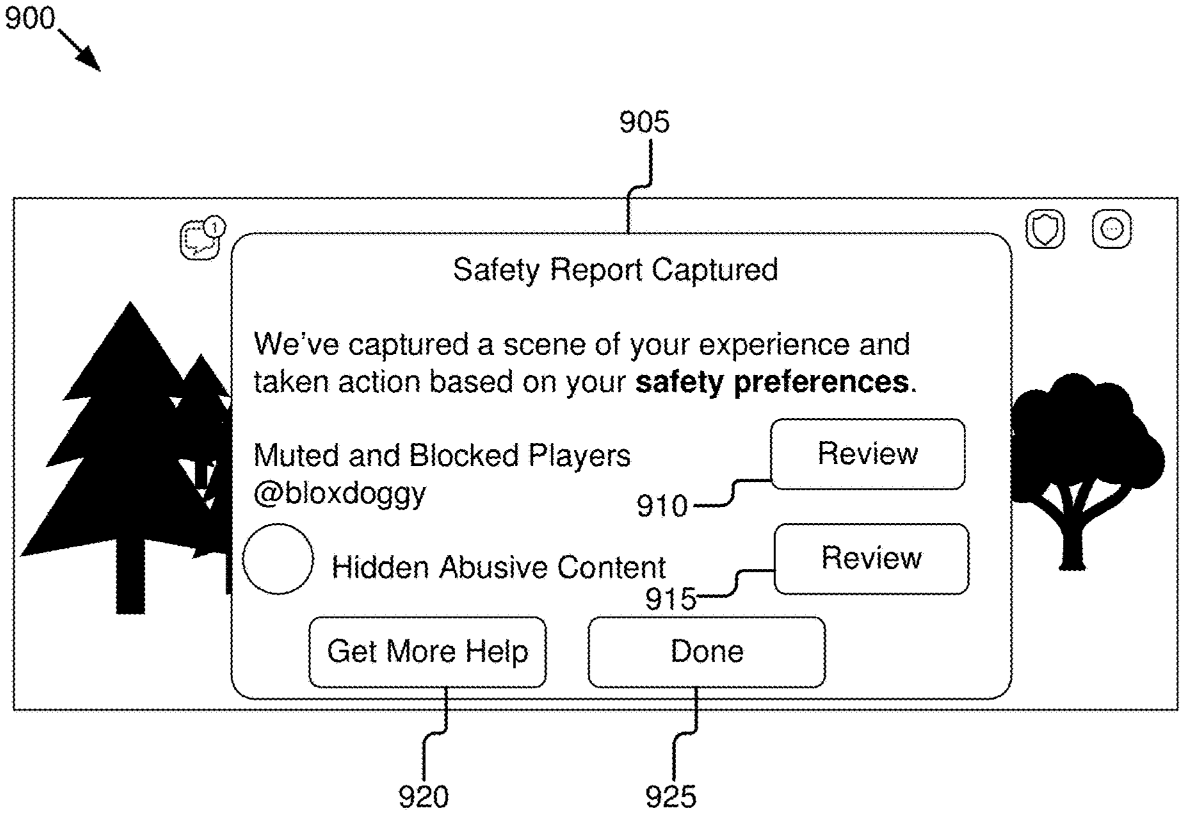
FIG. 9 includes an example user interface with a summary of the report of abuse, according to some embodiments described herein.

FIG. 9 illustrates an example user interface 900 with a summary 905 of the report of abuse. The summary 905 includes a list of muted and blocked players and an identification of the hidden abuse. If the user is unsure about these steps, the user may select a review button 910 for information about the muted and blocked player, a review button 915 for information about the hidden object, or a get more help button 920 for additional inquiries. If the user is satisfied, the user may select the done button 925.

The machine-learning module 206 implements a machine-learning model that is trained to output a determination of whether a selected candidate or object is associated with abuse. In some embodiments, the machine-learning model is trained with a training set that includes manual labels for abuse and manual labels for non-abuse. The abuse may include inappropriate avatars, inappropriate voice input, inappropriate actions, inappropriate object, etc. In some embodiments, the training data set includes chat logs, 2D captures, metadata, and other data used to output a determination of whether the selected candidate or object is associated with abuse.

The machine-learning module 206 trains the machine-learning model using the training dataset in a supervised learning fashion. In some embodiments, the machine-learning model is a deep neural network. Types of deep neural networks include convolutional neural networks, deep belief networks, stacked autoencoders, generative adversarial networks, variational autoencoders, flow models, recurrent neural networks, and attention bases models. A deep neural network uses multiple layers to progressively extract higher-level features from the raw input where the input to the layers are different types of features extracted from other modules and the outputs are a determination of whether the selected candidate or object is associated with abuse.

The machine-learning module 206 may implement machine learning model layers that identify increasingly more detailed features and patterns within the 2D capture of the virtual experience where the output of one layer serves as input to a subsequently more detailed layer until a final output is a determination of whether a selected candidate or object is associated with abuse. One example of different layers in the deep neural network may include token embeddings, segment embeddings, and positional embeddings.

Example Method

Figure 10:
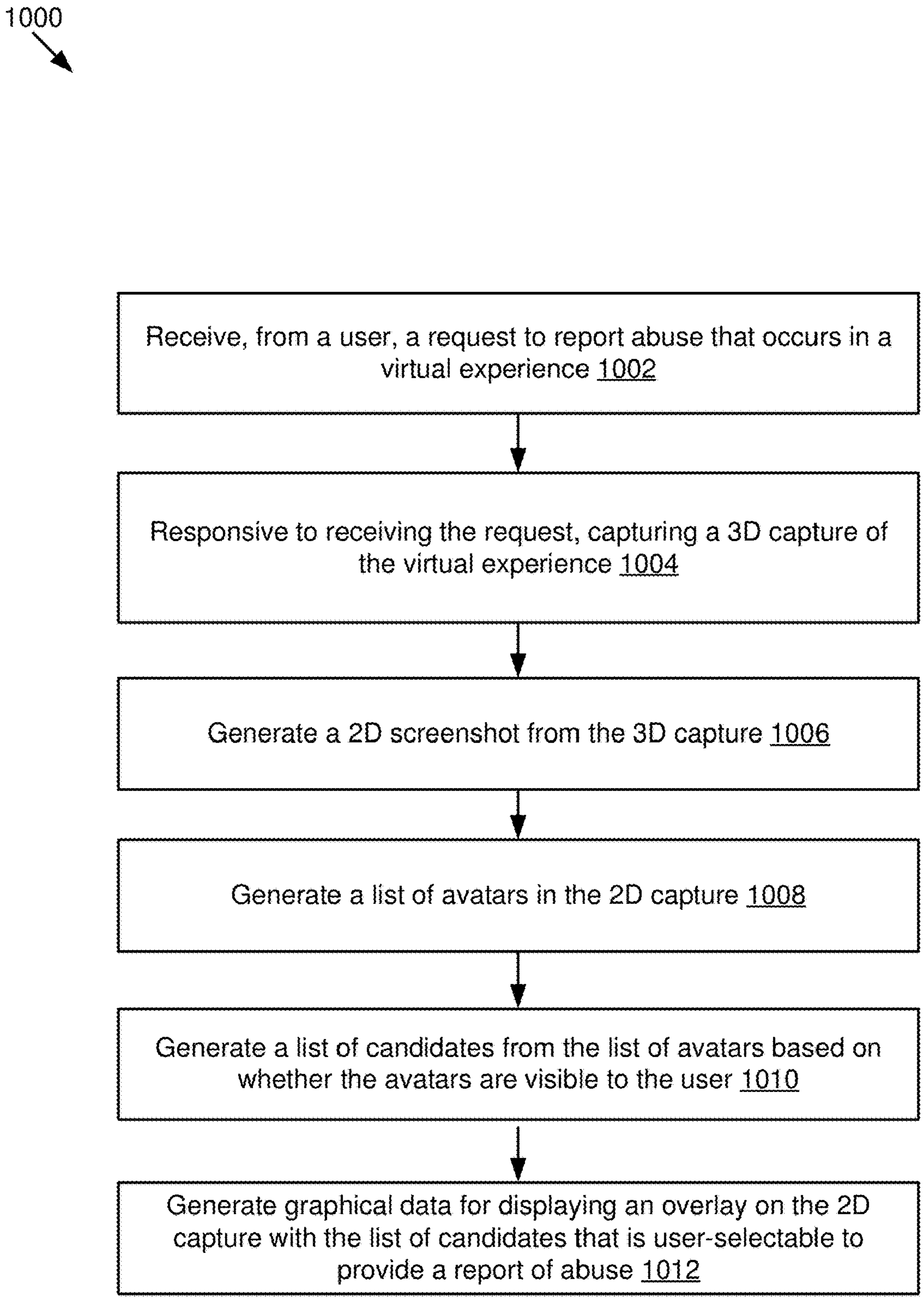
FIG. 10 is a flow diagram of an example method to generate graphical data for displaying an overlay that is user-selectable to provide a report of abuse, according to some embodiments described herein.

FIG. 10 is a flow diagram of an example method 1000 to generate graphical data for displaying an overlay that is user-selectable to provide a report of abuse. In some embodiments, all or portions of the method 1000 are performed by the metaverse application 104 stored on the client device 115 as illustrated in FIG. 1 and/or the metaverse application 104 stored on the computing device 200 of FIG. 2.

The method 1000 may begin with block 1002. At block 1002, a request to report abuse that occurs in a virtual experience is received from a user. Block 1002 may be followed by block 1004.

At block 1004, responsive to receiving the request, a 3D capture of the virtual experience is captured. Block 1004 may be followed by block 1006.

At block 1006, a 2D capture is generated from the 3D capture. In some embodiments, generating the 2D capture from the 3D capture includes determining a near-clip plane and a far-clip plane of a virtual camera that includes a field of view of the user between the near-clip plane and the far-clip plane. Block 1006 may be followed by block 1008.

At block 1008, a list of avatars in the 2D capture is determined. For example, the list of avatars may include any avatars that are within the field of view of the user between the near-clip plane and the far-clip plane. Block 1008 may be followed by block 1010.

At block 1010, a list of candidates from the list of avatars is generated based on whether the avatars are visible to the user. In some embodiments, generating the list of candidates from the list of avatars based on whether the avatars are visible to the user includes, for each avatar in the list of avatars: casting a ray from the avatar to the near-clip plane and determining that the avatar is visible to the user responsive to the ray intersecting with the near-clip plane. In some embodiments, instead of casting a ray from the avatar, for each avatar in the list of avatars: a bounding box is generated that surrounds the avatar, a ray is cast from the bounding box to the near-clip plane, and determining that the avatar is visible to the user occurs responsive to the ray intersecting with the near-clip plane.

An avatar may be visible even though the ray does not reach the near-clip plane. In some embodiments, responsive to determining that the ray does not intersect with the near-clip plane, a set of rays is cast from one or more edges of the bounding box to the near-clip plane and the candidate is determined to be visible responsive to one or more rays from the set of rays intersecting with the near-clip plane. In some embodiments, responsive to determining that the ray does not intersect with the near-clip plane, a second ray is cast from the near-clip plane to the bounding box and the avatar is determined to be visible responsive to the second ray intersecting with the avatar. Block 1010 may be followed by block 1012.

At block 1012, graphical data is generated for displaying an overlay on the 2D capture with the list of candidates that is user-selectable to provide a report of abuse. In some embodiments, the report of abuse includes an identification of a type of abuse that is selected from the group of an inappropriate avatar, an inappropriate voice input, an inappropriate action, an inappropriate object in the 2D capture, and combinations thereof.

In some embodiments, a selection of one or more of the candidates in the list of candidates is received for the report of abuse. The report of abuse ma include the 2D capture of the virtual experience, an identification of a type of abuse, and an identifier of a selected avatar. Once the report of abuse is complete, the report may be provided to a machine-learning model, where the machine-learning model outputs a determination of whether the selection of the one or more candidates committed abuse. After submitting the report of abuse, the selected one or more candidates may be blocked. If the report of abuse includes an identification of an inappropriate object in the 2D capture, the inappropriate object may be hidden from the virtual experience.

While the foregoing description refers to a first avatar that is blocked by a user, it will be appreciated that a virtual experience may include any number of avatars, with each avatar blocking zero, one, or more other avatars. For each avatar, respective additional audio is generated (e.g., locally on the client device of the user associated with the avatar) to block out audio from the corresponding blocked avatars. In some embodiments, e.g., if a user blocks three avatars at different locations, three distinct portions of additional audio may be generated, each corresponding to a particular blocked avatar. In some embodiments, if two or more blocked avatars are co-located (at or near a same location), a single portion of additional audio may be generated corresponding to the two or more blocked avatars.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., client device only; client+server device; etc.) and where the data analysis is performed (e.g., client device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

receiving, from a user, a request to report abuse that occurs in a virtual experience;

responsive to receiving the request, capturing a three-dimensional (3D) capture of the virtual experience;

generating a two-dimensional (2D) capture from the 3D capture;

determining a list of avatars in the 2D capture;

generating a list of candidates from the list of avatars based on whether the avatars are visible to the user; and generating graphical data for displaying an overlay on the 2D capture with the list of candidates that is user-selectable to provide a report of abuse.

2. The method of claim 1, wherein generating the 2D capture from the 3D capture includes determining a near-clip plane and a far-clip plane of a virtual camera that includes a field of view of the user between the near-clip plane and the far-clip plane.

3. The method of claim 2, wherein generating the list of candidates from the list of avatars based on whether the avatars are visible to the user includes, for each avatar in the list of avatars:

casting a ray from the avatar to the near-clip plane; and determining that the avatar is visible to the user responsive to the ray intersecting with the near-clip plane.

4. The method of claim 2, wherein generating the list of candidates from the list of avatars based on whether the avatars are visible to the user includes, for each avatar in the list of avatars:

generating a bounding box that surrounds the avatar;

casting a ray from the bounding box to the near-clip plane; and determining that the avatar is visible to the user responsive to the ray intersecting with the near-clip plane.

5. The method of claim 4, wherein generating the list of candidates further includes, for each candidate in the list of candidates:

responsive to determining that the ray does not intersect with the near-clip plane, casting a set of rays from one or more edges of the bounding box to the near-clip plane; and determining that the candidate is visible responsive to one or more rays from the set of rays intersecting with the near-clip plane.

6. The method of claim 4, wherein generating the list of candidates further includes, for each candidate in the list of candidates:

responsive to determining that the ray does not intersect with the near-clip plane, casting a second ray from the near-clip plane to the bounding box; and determining that the avatar is visible responsive to the second ray intersecting with the avatar.

7. The method of claim 1, wherein the report of abuse includes an identification of a type of abuse that is selected from the group of an inappropriate avatar, an inappropriate voice input, an inappropriate action, an inappropriate object in the 2D capture, and combinations thereof.

8. The method of claim 1, further comprising:

receiving, from the user, a selection of one or more of the candidates in the list of candidates for the report of abuse; and including the 2D capture of the virtual experience, an identification of a type of abuse, and an identifier of a selected avatar in the report of abuse.

9. The method of claim 8, further comprising:

providing the report of abuse to a machine-learning model, wherein the machine-learning model outputs a determination of whether at least one candidate from the selection of the one or more candidates committed abuse.

10. The method of claim 8, further comprising:

blocking the selected one or more candidates; and responsive to the report of abuse including an identification of an inappropriate object in the 2D capture, hiding the inappropriate object from the virtual experience.

11. A non-transitory computer-readable medium with instructions that, when executed by one or more processors at a client device, cause the one or more processors to perform operations, the operations comprising:

receiving, from a user, a request to report abuse that occurs in a virtual experience;

responsive to receiving the request, capturing a three-dimensional (3D) capture of the virtual experience;

generating a two-dimensional (2D) capture from the 3D capture;

determining a list of avatars in the 2D capture;

generating a list of candidates from the list of avatars based on whether the avatars are visible to the user; and generating graphical data for displaying an overlay on the 2D capture with the list of candidates that is user-selectable to provide a report of abuse.

12. The computer-readable medium of claim 11, wherein generating the 2D capture from the 3D capture includes determining a near-clip plane and a far-clip plane of a virtual camera that includes a field of view of the user between the near-clip plane and the far-clip plane.

13. The computer-readable medium of claim 12, wherein generating the list of candidates from the list of avatars based on whether the avatars are visible to the user includes, for each avatar in the list of avatars:

casting a ray from the avatar to the near-clip plane; and determining that the avatar is visible to the user responsive to the ray intersecting with the near-clip plane.

14. The computer-readable medium of claim 12, wherein generating the list of candidates from the list of avatars based on whether the avatars are visible to the user includes, for each avatar in the list of avatars:

generating a bounding box that surrounds the avatar;

casting a ray from the bounding box to the near-clip plane; and determining that the avatar is visible to the user responsive to the ray intersecting with the near-clip plane.

15. The computer-readable medium of claim 14, wherein generating the list of candidates further includes, for each candidate in the list of candidates:

responsive to determining that the ray does not intersect with the near-clip plane, casting a set of rays from one or more edges of the bounding box to the near-clip plane; and determining that the candidate is visible responsive to one or more rays from the set of rays intersecting with the near-clip plane.

16. A system comprising:

a processor; and a memory coupled to the processor, with instructions stored thereon that, when executed by the processor, cause the processor to perform operations comprising:

receiving, from a user, a request to report abuse that occurs in a virtual experience;

responsive to receiving the request, capturing a three-dimensional (3D) capture of the virtual experience;

generating a two-dimensional (2D) capture from the 3D capture;

determining a list of avatars in the 2D capture;

generating a list of candidates from the list of avatars based on whether the avatars are visible to the user; and generating graphical data for displaying an overlay on the 2D capture with the list of candidates that is user-selectable to provide a report of abuse.

17. The system of claim 16, wherein generating the 2D capture from the 3D capture includes determining a near-clip plane and a far-clip plane of a virtual camera that includes a field of view of the user between the near-clip plane and the far-clip plane.

18. The system of claim 17, wherein generating the list of candidates from the list of avatars based on whether the avatars are visible to the user includes, for each avatar in the list of avatars:

casting a ray from the avatar to the near-clip plane; and determining that the avatar is visible to the user responsive to the ray intersecting with the near-clip plane.

19. The system of claim 17, wherein generating the list of candidates from the list of avatars based on whether the avatars are visible to the user includes, for each avatar in the list of avatars:

generating a bounding box that surrounds the avatar;

casting a ray from the bounding box to the near-clip plane; and determining that the avatar is visible to the user responsive to the ray intersecting with the near-clip plane.

20. The system of claim 19, wherein generating the list of candidates further includes, for each candidate in the list of candidates:

responsive to determining that the ray does not intersect with the near-clip plane, casting a set of rays from one or more edges of the bounding box to the near-clip plane; and determining that the candidate is visible responsive to one or more rays from the set of rays intersecting with the near-clip plane.

* * * * *